United States Patent
Okabe et al.

(10) Patent No.: US 9,149,687 B2
(45) Date of Patent: Oct. 6, 2015

(54) GOLF BALL

(75) Inventors: Satoko Okabe, Kobe (JP); Kazuhiko Isogawa, Kobe (JP); Keiko Matsuhisa, Yokkaichi (JP)

(73) Assignees: DUNLOP SPORTS CO. LTD., Kobe-shi (JP); MITSUBISHI CHEMICAL CORPORATION, Tokyo (JP)

( * ) Notice: Subject to any disclaimer, the term of this patent is extended or adjusted under 35 U.S.C. 154(b) by 759 days.

(21) Appl. No.: 13/080,276

(22) Filed: Apr. 5, 2011

(65) Prior Publication Data

US 2011/0244986 A1   Oct. 6, 2011

(30) Foreign Application Priority Data

Apr. 6, 2010   (JP) ................... 2010-087538

(51) Int. Cl.
*A63B 37/02* (2006.01)
*A63B 37/06* (2006.01)
(Continued)

(52) U.S. Cl.
CPC ......... *A63B 37/0038* (2013.01); *A63B 37/0039* (2013.01); *A63B 37/0043* (2013.01); *A63B 37/0048* (2013.01); *A63B 37/0049* (2013.01); *A63B 37/0087* (2013.01); *A63B 37/0091* (2013.01); *C08G 63/47* (2013.01); *A63B 37/0031* (2013.01); *A63B 37/0033* (2013.01);
(Continued)

(58) Field of Classification Search
CPC ........ C08G 63/91; C08G 63/46; C08G 63/47; A63B 37/0038; A63B 37/0039
See application file for complete search history.

(56) References Cited

U.S. PATENT DOCUMENTS

| 5,556,098 A | 9/1996 | Higuchi et al. |
| 5,872,185 A | 2/1999 | Ichikawa et al. |

(Continued)

FOREIGN PATENT DOCUMENTS

| GB | 2 278 609 A | 12/1994 |
| JP | 6-142228 A | 5/1994 |

(Continued)

OTHER PUBLICATIONS

English Translation of Office Action dated Jul. 30, 2013 for Japanese Application No. 2010-087538.

*Primary Examiner* — John E Simms, Jr.
(74) *Attorney, Agent, or Firm* — Birch, Stewart, Kolasch & Birch, LLP (57) ABSTRACT

An object of the present invention is to provide a golf ball excellent in resilience and durability, with a good moldability of the intermediate layer. The present invention provides a golf ball having a center, a cover, and an intermediate layer disposed between the center and the cover, wherein the intermediate layer is formed from an intermediate layer composition having a flexural modulus ranging from 150 MPa to 450 MPa, a maximum loss factor (tan δ) between −20° C. and 0° C. of 0.08 or less, a rebound resilience of 55% or more, and a slab hardness ranging from 40 to 60 in Shore D hardness, and the intermediate layer composition comprises, as a resin component, 30 mass % to 70 mass % of (A) a modified polyester elastomer having a Shore A hardness of 95 or less; 70 mass % to 30 mass % of (B) a binary ionomer resin having a Shore D hardness of 65 or more, a flexural modulus of 300 MPa or more, and a melt flow rate (190° C., 2.16 kg) of 1.0 g/10 min or more; and 0 mass % to 50 mass % of (C) a thermoplastic resin other than (A) component and (B) component (provided that a total content of (A) component, (B) component, and (C) component is 100 mass %).

19 Claims, 1 Drawing Sheet

(51) Int. Cl.
　　*A63B 37/00*　　　(2006.01)
　　*C08G 63/47*　　　(2006.01)
　　*C08G 63/91*　　　(2006.01)
　　*C08G 63/46*　　　(2006.01)

(52) U.S. Cl.
　　CPC ......... *A63B37/0035* (2013.01); *A63B 37/0045* (2013.01); *A63B 37/0047* (2013.01); *A63B 37/0062* (2013.01); *A63B 37/0063* (2013.01); *A63B 37/0065* (2013.01); *A63B 37/0066* (2013.01); *A63B 2037/0079* (2013.01); *C08G 63/46* (2013.01); *C08G 63/91* (2013.01)

(56) References Cited

U.S. PATENT DOCUMENTS

| | | | |
|---|---|---|---|
| 5,977,264 A * | 11/1999 | Ichikawa et al. | 525/329.9 |
| 6,015,356 A | 1/2000 | Sullivan et al. | |
| 6,120,392 A | 9/2000 | Kashiwagi et al. | |
| 6,579,939 B2 * | 6/2003 | Ichikawa et al. | 525/89 |
| 6,653,402 B2 * | 11/2003 | Ichikawa et al. | 525/71 |
| 6,875,133 B2 * | 4/2005 | Iwami | 473/378 |
| 7,091,269 B2 | 8/2006 | Takesue et al. | |
| 2001/0018374 A1 * | 8/2001 | Ichikawa et al. | 473/367 |
| 2005/0020783 A1 * | 1/2005 | Takesue et al. | 525/439 |
| 2007/0015606 A1 * | 1/2007 | Umezawa et al. | 473/371 |
| 2008/0254914 A1 * | 10/2008 | Manami et al. | 473/373 |
| 2009/0082137 A1 * | 3/2009 | Okabe | 473/385 |
| 2009/0312121 A1 * | 12/2009 | Isogawa et al. | 473/374 |

FOREIGN PATENT DOCUMENTS

| | | | |
|---|---|---|---|
| JP | 6-343718 A | 12/1994 | |
| JP | 7-24084 A | 1/1995 | |
| JP | 10-80505 A | 3/1998 | |
| JP | 10-201880 A | 8/1998 | |
| JP | 2000-84117 A | 3/2000 | |
| JP | 2000-176050 A | 6/2000 | |
| JP | 2003-183484 A | 7/2003 | |
| JP | 2003183484 * | 7/2003 | C08G 63/91 |
| JP | 2005-13487 A | 1/2005 | |
| JP | 2009-297261 A | 12/2009 | |

* cited by examiner

GOLF BALL

FIELD OF THE INVENTION

The present invention relates to a golf ball, more particularly to an improvement of the intermediate layer of the golf ball.

DESCRIPTION OF THE RELATED ART

Golf balls comprising a center, a cover, and an intermediate layer disposed between the center and the cover are known. The intermediate layer is referred to as "inner cover layer" or "outer core layer" based on the golf ball construction. In order to improve the golf ball performance, materials for the intermediate layer have been studied.

For example, Japanese Patent Publication No. H06-343718 A discloses a golf ball comprising (i) a spherical center, (ii) an inner cover layer molded on the spherical center, having a modulus of 15,000 to 70,000 psi, and containing a high acid content ionomer resin containing a copolymer with 17 to 25 weight % of α,β-unsaturated carboxylic acid, and (iii) an outer cover layer molded on the inner cover layer, having a modulus of 1,000 to 10,000 psi, and containing a polymer material selected from the group consisting of an ionomer resin and a nonionic thermoplastic elastomer.

Japanese Patent Publication No. H10-201880 A discloses a multi-layer golf ball having a greater moment of inertia comprising a core, an inner cover layer and an outer cover layer having a dimpled surface, wherein said core has a diameter from 1.28 to 1.57 inches and a weight of 18 to 38.7 grams, said inner cover layer has a thickness of from 0.01 to 0.200 inches and a weight, with core, of 32.2 to 44.5 grams and said outer cover layer has a thickness of from 0.01 to 0.110 inches and a weight, with core and inner cover layer, of 45.0 to 45.93 grams.

Japanese Patent Publication No. H07-24084 A discloses a three-piece golf ball comprising a center core having a diameter of 26 mm or more, a density of less than 1.4 and a JIS-C hardness of 80 or less, an intermediate layer having a thickness of 1 mm or more, specific gravity of less than 1.2 and a JIS-C hardness of less than 80, and a cover having a thickness of 1 to 3 mm, a JIS-C hardness of 85 or more, wherein the center core is formed from a rubber composition containing a polybutadiene as a base material, and the intermediate layer is formed from a thermoplastic polyester elastomer as a base material.

Japanese Patent Publication No. 2000-84117 A discloses a golf ball comprising a core, an intermediate layer around the core, and a cover around the intermediate layer, wherein said intermediate layer is formed mainly of a heated mixture of (A) a thermoplastic polyether ester elastomer having a Shore D hardness of 25 to 50, a tan δ value of 0.1 or less in the temperature range of −10° C. to 20° C. as determined by viscoelasticity measurement, and a glass transition temperature of not higher than −20° C. and (B) an olefin elastomer, modified olefin elastomer, styrene-conjugated diene block copolymer or hydrogenated styrene-conjugated diene block copolymer, having a JIS A hardness of 80 or less.

Japanese Patent Publication No. H06-142228 A discloses a multi-piece solid golf ball comprising a multi-layered solid core consisting of an inner core and one or at least two outer core layers covering the inner core, and a cover covering the multi-layered core, wherein the outer core layer is formed from a material mainly containing a mixture of 50% to 100% of a thermoplastic polyether ester elastomer having a Shore D hardness of 30 to 50, a glass transition temperature of −25° C. or less determined by differential thermal analysis (DSC) and 0% to 50% of an ionomer consisting of an ethylene-(meth) acrylic acid copolymer having a flexural modulus of 200 MPa to 400 MPa, and the cover is formed from an ionomer consisting of an ethylene-(meth)acrylic acid copolymer having a flexural modulus of 200 to 450 MPa, and a Shore D hardness of 55 to 68.

Japanese Patent Publication No. H10-80505 A discloses a golf ball comprising a core, an intermediate layer enclosing a surface of the core, and a cover enclosing a surface of the intermediate layer, wherein a resin component forming said intermediate layer contains a mixture of 10 to 60 parts by weight of a thermoplastic elastomer having a crystalline polyethylene block and 90 to 40 parts by weight of an ionomer resin having a melt index of at least 3 g/10 min. at 190° C. as a primary component.

Japanese Patent Publication No. 2000-176050 A discloses a multi-piece golf ball with at least three layers comprising a core, an intermediate layer, and a cover, wherein the intermediate layer is formed from a material blending a product obtained by heating and mixing 100 parts by mass of a thermoplastic polyester elastomer and 0.1 to 10 parts by mass of a metal compound containing magnesium oxide or magnesium hydroxide Japanese Patent Publication No. 2005-13487 A discloses a golf ball comprising a core and a cover of one or more layers enclosing the core, wherein at least one layer which constitutes said cover is formed primarily of a mixture comprising (A) an ionomer resin composition, (B) a thermoplastic elastomer selected from a thermoplastic polyester elastomer, thermoplastic block copolymer and thermoplastic polyurethane, and (C) a thermoplastic block copolymer terminated with a functional group capable of reacting with the ionomer resin, in such a proportion as to provide a A/(B+C) weight ratio between 50/50 and 98/2 and a B/C weight ratio between 9/1 and 1/1.

Japanese Patent Publication No. 2003-183484 A discloses a thermoplastic resin composition comprising a modified polyester elastomer obtained by a reaction between a polyester elastomer and an unsaturated carboxylic acid or a derivative thereof in the presence of a radical generator. As an application of the thermoplastic resin composition, a golf ball is exemplified.

SUMMARY OF THE INVENTION

The intermediate layer composition having a higher resilience than the intermediate layer composition using a blend of a polystyrene elastomer and an ionomer resin is required. It is difficult to provide a higher resilience in a range from 40 to 50 in Shore D hardness if a polyester elastomer is solely used for the intermediate layer. A blend of the ionomer resin for a higher resilience causes a problem that the durability becomes low. Although the ionomer resin having a high neutralization degree provides a high resilience, the problem is that the moldability thereof is low. The present invention has been achieved in view of the above circumstances. An object of the present invention is to provide a golf ball excellent in resilience and durability, with a moldability of the intermediate layer.

The present invention that has solved the above problems provides a golf ball having a center, a cover, and an intermediate layer disposed between the center and the cover, wherein the intermediate layer is formed from an intermediate layer composition having a flexural modulus ranging from 150 MPa to 450 MPa, a maximum loss factor (tan δ) between −20° C. and 0° C. of 0.08 or less, a rebound resilience of 55% or more, and a slab hardness ranging from 40 to 60 in Shore D hardness, and the intermediate layer composition comprises, as a resin component, 30 mass % to 70 mass % of (A) a modified polyester elastomer having a Shore A hardness of 95 or less; 70 mass % to 30 mass % of (B) a binary ionomer resin having a Shore D hardness of 65 or more, a flexural modulus of 300 MPa or more, and a melt flow rate (190° C., 2.16 kg) of 1.0 g/10 min or more; and 0 mass % to 50 mass % of (C) a thermoplastic resin other than (A) component and (B) component (provided that a total content of (A) component, (B) component, and (C) component is 100 mass %).

(A) The modified polyester elastomer has high compatibility with (B) the binary ionomer resin and has an action of softening the obtained intermediate layer. As a result, (A) the modified polyester elastomer imparts a good shot feeling to the golf ball. (A) The modified polyester elastomer is preferably obtained by a reaction between 0.01 mass % to 30 mass % of (a-3) an unsaturated carboxylic acid or a derivative thereof and 100 mass % of (a-2) a polyester elastomer containing a polyalkyelene glycol in a content ranging from 5 mass % to 90 mass % in a presence of (a-1) a radical generator.

According to the present invention, a golf ball excellent in resilience and durability with a good moldability of the intermediate layer is obtained.

DESCRIPTION OF THE PREFERRED EMBODIMENT

The present invention provides a golf ball having a center, a cover, and an intermediate layer disposed between the center and the cover, wherein the intermediate layer is formed from an intermediate layer composition having a flexural modulus ranging from 150 MPa to 450 MPa, a maximum loss factor (tan δ) between −20° C. and 0° C. of 0.08 or less, a rebound resilience of 55% or more, and a slab hardness ranging from 40 to 60 in Shore D hardness, and the intermediate layer composition comprises, as a resin component, 30 mass % to 70 mass % of (A) a modified polyester elastomer having a Shore A hardness of 95 or less; 70 mass % to 30 mass % of (B) a binary ionomer resin having a Shore D hardness of 65 or more, a flexural modulus of 300 MPa or more, and a melt flow rate (190° C., 2.16 kg) of 1.0 g/10 min or more; and 0 mass % to 50 mass % of (C) a thermoplastic resin other than (A) component and (B) component (provided that a total content of (A) component, (B) component, and (C) component is 100 mass %).

(1) Intermediate Layer Composition

The intermediate layer of the golf ball of the present invention is formed from an intermediate layer composition containing (A) a modified polyester elastomer having a Shore A hardness of 95 or less; (B) a binary ionomer resin having a Shore D hardness of 65 or more, a flexural modulus of 300 MPa or more, and a melt flow rate (190° C., 2.16 kg) of 1.0 g/10 min or more; and (C) a thermoplastic resin other than (A) component and (B) component.

First, (A) the modified polyester elastomer having a Shore A hardness of 95 or less will be explained. (A) The modified polyester elastomer used in the present invention is preferably obtained by carrying out a reaction between (a-3) an unsaturated carboxylic acid or a derivative thereof and (a-2) a polyester elastomer in a presence of (a-1) a radical generator.

In the modification reaction, it is considered that the graft reaction of (a-3) the unsaturated carboxylic acid or a derivative thereof to (a-2) the polyester elastomer mainly occurs with some other reactions such as a reaction where the unsaturated carboxylic acid or a derivative is added to the terminal of the polyester elastomer, an ester exchange reaction, and decomposition. (A) The modified polyester elastomer preferably has (a-3) the unsaturated carboxylic acid or a derivative thereof which is grafted in a content ranging from 0.03 mass % to 20 mass %. The grafting content more preferably ranges from 0.06 mass % to 4 mass %, even more preferably 0.08 mass % to 1.5 mass %. If the grafting content falls within the above range, the dispersibility into (B) the binary ionomer resin improves and the durability of the obtained golf ball becomes better.

Although many polyester elastomers are known, as (a-2) the polyester elastomer, preferred is a polyester elastomer composed of an aromatic polyester component as a hard segment and a polyalkylene glycol or aliphatic polyester component as a soft segment. In the present invention, particularly preferred is a polyester polyether block copolymer having an aromatic polyester component as the hard segment and a polyalkylene glycol component as the soft segment. The content of the polyalkylene glycol component is preferably in a range from 5 mass % to 90 mass %, more preferably 30 mass % to 80 mass %, even more preferably 55 mass % to 80 mass % in the block copolymer produced. In general, it tends to be difficult to produce the polymer having a high content of the polyalkylene glycol component by a condensation polymerization. Further, it is also difficult that the thermoplastic resin consisting of the polymer having a high content of the polyalkylene glycol as a material and the ionomer resin exhibits an appropriate hardness and a high rebound resilience. On the contrary, if the content of the polyalkylene glycol component is low, the elastic property becomes low. Thus, it is difficult that the intermediate layer composition consisting of the polymer having a low content of the polyalkylene glycol as a material and the ionomer resin exhibits an appropriate softness and a high rebound resilience. Further, the dispersibility into (B) the binary ionomer resin becomes low.

The polyester polyether block copolymer can be produced by preparing an oligomer by esterification or an ester exchange reaction in a conventional method, using an aliphatic diol or alicyclic diol each having 2 to 12 carbon atoms, and an aromatic dicarboxylic acid, aliphatic dicarboxylic acid or an alkyl ester thereof as a component forming the hard segment; and a polyalkylene glycol having a weight average molecular weight from 400 to 6,000 as a component forming the soft segment; and condensation polymerizing the obtained oligomer. Examples of the aliphatic diol or alicyclic diol each having 2 to 12 carbon atoms include ethylene glycol, propylene glycol, trimethylene glycol, 1,4-butane diol, 1,4-cyclohexanediol, and 1,4-cyclohexanedimethanol. Among them, preferred is 1,4-butane diol or ethylene glycol, particularly preferred is 1,4-butane diol. These diols may be used in combination of two or more.

As the aromatic dicarboxylic acid, those which are generally used as a raw material for polyester elastomers can be used. Examples thereof include terephthalic acid, isophthalic acid, phthalic acid, and 2,6-naphthalene dicarboxylic acid. The aromatic dicarboxylic acid preferably includes terephthalic acid or 2,6-naphthalene dicarboxylic acid, more preferably terephthalic acid. These aromatic dicarboxylic acids may be used in combination of two or more. Examples of the alkyl esters of the aromatic dicarboxylic acids include dimethyl esters and diethyl esters of the aromatic dicarboxylic acids. Preferred is dimethyl terephthalate or dimethyl 2,6- naphthalate. The alicyclic dicarboxylic acid preferably includes cyclohexane dicarboxylic acid. The alkyl ester thereof preferably includes a dimethyl ester or a diethyl ester. In addition to the above components, a small amount of a tri-functional alcohol, tricarboxylic acid, or esters thereof may be copolymerized, if desired. Also, an aliphatic dicarboxylic acid such as adipic acid or its dialkyl ester may be used as a comonomer.

The polyalkylene glycol having a weight-average molecular weight ranging from 400 to 6,000 is preferably used. The weight-average molecular weight is more preferably 500 to 4,000, even more preferably 600 to 3,000. In general, if the polyalkylene glycol having a low weight-average molecular weight is used, it becomes difficult that the resultant polyester elastomer exhibits the elastic property. On the contrary, the polyalkylene glycol having an excessively high weight-average molecular weight tends to cause the phase separation of the reaction system, and the properties of the resultant polyester elastomer tend to be lowered. Examples of the polyalkylene glycol include polyethylene glycol, poly(1,2- and 1,3-propylene ether)glycol, polytetramethylene glycol, and polyhexamethylene glycol. The commercial products of polyester elastomers include "Primalloy" (Mitsubishi Chemical Corporation), "Pelprene" (Toyobo Co., Ltd.), and "Hytrel" (Du Pont-Toray Co., Ltd.), etc.

(a-2) The polyester elastomer used in the present invention preferably has polybutylene terephthalate as the hard segment and polytetramethylene glycol as the soft segment.

Examples of (a-3) the unsaturated carboxylic acid used for the modification of the polyester elastomer include unsaturated carboxylic acids such as acrylic acid, maleic acid, fumaric acid, tetrahydrophtalic acid, itaconic acid, citraconic acid, crotonic acid, and isocrotonic acid. Examples of the derivative thereof include an ester and an anhydride thereof. The anhydride having an unsaturated bond in the side chain can be also used. Examples include unsaturated carboxylic anhydrides such as (2-octene-1-yl)succinic anhydride, (2-dodecene-1-yl)succinic anhydride, (2-octadecene-1-yl) succinic anhydride, maleic anhydride, 2,3-dimethylmaleic anhydride, bromomaleic anhydride, dichloromaleic anhydride, citraconic anhydride, itaconic anhydride, 1-butene-3,4-dicarboxylic acid anhydride, 1-cyclopentene-1,2-dicarboxylic acid anhydride, 1,2,3,6-tetrahydrophthalic anhydride, 3,4,5,6-tetrahydrophthalic anhydride, exo-3,6-epoxy-1,2,3,6-tetrahydrophthalic anhydride, 5-norbornene-2,3-dicarboxylic anhydride, methyl-5-norbornene-2,3-dicarboxylic anhydride, endo-bicyclo[2.2.2]oct-5-ene-2,3-dicarboxylic anhydride, and bicyclo[2.2.2]oct-7-ene-2,3,5,6-tetracarboxylic anhydride; and unsaturated carboxylic acid esters such as methyl(meth)acrylate, ethyl(meth)acrylate, propyl(meth)acrylate, butyl(meth)acrylate, hexyl (meth) acrylate, octyl(meth)acrylate, 2-ethylhexyl(meth)acrylate, lauryl (meth)acrylate, stearyl(meth)acrylate, glycidyl(meth) acrylate, dimethyl maleate, 2-ethylhexyl maleate, 2-hydroxyethyl methacrylate. Among them, preferred is an anhydride of the unsaturated carboxylic acid, particularly preferred is an anhydride of maleic acid. These compounds having unsaturated bonds are suitably selected according to the type of the polyester elastomer to be modified and the modification conditions, and may be used in combination of two or more.

As (a-1) the radical generator, various compounds can be used. Examples of the radical generator include organic or inorganic peroxides such as t-butyl hydroperoxide, cumene hydroperoxide, 2,5-dimethylhexane 2,5-dihyroperoxide, 2,5-dimethyl-2,5-bis(t-butyloxy)hexane, 3,5,5-trimethylhexanoyl peroxide, t-butyl peroxybenzoate, benzoyl peroxide, dicumyl peroxide, 1,3-bis(t-butylperoxyisopropyl)benzene, dibutyl peroxide, methyl ethyl ketone peroxide, potassium peroxide, and hydrogen peroxide; azo compounds such as 2,2'-azobisisobutyronitrile, 2,2'-azobis(isobutylamide)dihalide, 2,2'-azobis[2-methyl-N-(2-hydroxyethyl)propionamide], and azodi-t-butane; and carbon radical generators such as dicumyl. The radical generators are suitably selected according to the type of the polyester elastomer to be modified, the type of the unsaturated carboxylic acid or derivative thereof and the modification conditions, and may be used in combination of two or more.

In the modification reaction, the blending ratio of (a-3) component preferably ranges from 0.01 mass % to 30 mass %, more preferably 0.05 mass % to 5 mass %, even more preferably 0.1 mass % to 2 mass %, most preferably 0.1 mass % to 1 mass % with respect to 100 mass % of (a-2) component. The blending ratio of (a-1) component preferably ranges from 0.001 mass % to 3 mass %, more preferably 0.005 mass % to 0.5 mass %, even more preferably 0.01 mass % to 0.2 mass %, most preferably 0.01 mass % to 0.1 mass % with respect to 100 mass % of (a-2) component. In most preferable modification, the blending ratio of (a-3) component ranges from 0.1 mass % to 1 mass % and the blending ratio of (a-1) component ranges from 0.01 mass % to 0.1 mass %, with respect to 100 mass % of (a-2) component.

In general, if the blending amount of (a-3) component is low, the modification degree becomes small, and thus the intermediate layer composition obtained by blending the resultant polyester elastomer and the ionomer resin does not tend to exhibit a sufficient abrasion resistance. On the other hand, if the blending amount is excessive, the resultant polyester elastomer has a low viscosity when melt, and thus it is difficult to mold the intermediate layer composition obtained by blending the resultant polyester elastomer with the ionomer resin. Further, if the blending amount of (a-1) component is too low, the modification does not occur sufficiently, and thus the sufficient wear resistance is hardly exhibited. On the contrary, if the blending amount is too much, the resultant polyester elastomer has a low viscosity when melt, and thus the moldability becomes worse.

The modification for producing the modified polyester elastomer using (a-1) component, (a-2) component, and (a-3) component is conducted by a known method such as a melt kneading method, solution method and suspended dispersion method. Conventionally, the melt kneading method is preferable. In case of the melt kneading method, (a-2) component, (a-3) component, and (a-1) component may be uniformly mixed in a predetermined blending ratio using a Henschel mixer, a ribbon blender, a V-shape blender or the like and then the resultant mixture may be melt-kneaded using a Banbury mixer, a kneader, a roll, or a single- or multi- (e.g. twin-) screw kneading extruder. If necessary, (a-3) component and (a-2) component may be solved in a solvent for the modification reaction. The melt kneading is preferably performed at the temperature ranging from 100° C. to 300° C., more preferably 120° C. to 280° C., even more preferably 150° C. to 250° C., so as to avoid the thermal degradation of the resins.

(A) The modified polyester elastomer used in the present invention preferably has a slab hardness of 95 or less, more preferably 93 or less, even more preferably 91 or less in Shore A hardness, and preferably has a slab hardness of 70 or more, more preferably 75 or more, even more preferably 80 or more in Shore A hardness. If the slab hardness of the modified polyester elastomer falls within the above range, the intermediate layer composition tends to have a hardness in a desired range, and shows a good balance with the resilience. The slab hardness of the modified polyester elastomer means a hardness obtained by measuring the modified polyester elastomer formed in a sheet form, and can be measured by a later-described method.

Next, (B) the binary ionomer resin will be explained. The binary ionomer resin is one prepared by neutralizing at least a part of carboxyl groups in a binary copolymer composed of olefin and α,β-unsaturated carboxylic acid having 3 to 8 carbon atoms with a metal ion. The olefin preferably includes an olefin having 2 to 8 carbon atoms. Examples of the olefin include ethylene, propylene, butene, pentene, hexene, heptene, and octene. Among them, ethylene is more preferred. Examples of the α,β-unsaturated carboxylic acid are acrylic acid, methacrylic acid, fumaric acid, maleic acid and crotonic acid. Among these, acrylic acid and methacrylic acid are particularly preferred. Among them, as (B) the binary ionomer resin, preferred is a metal ion-neutralized product of the binary copolymer composed of ethylene-(meth)acrylic acid.

The content of α,β-unsaturated carboxylic acid having 3 to 8 carbon atoms in (B) the binary ionomer resin is preferably 15 mass % or more, more preferably 16 mass % or more, even more preferably 17 mass % or more, and is preferably 30 mass % or less, more preferably 25 mass % or less. If the content of α,β-unsaturated carboxylic acid is 15 mass % or more, the resilience and hardness become better, while if the acid content is 30 mass % or less, the balance among the resilience, moldability and hardness becomes better.

Examples of a metal (ion) used for neutralizing the binary copolymer include: monovalent metals (ions) such as sodium, potassium, lithium, or the like; divalent metals (ions) such as magnesium, calcium, zinc, barium, cadmium, or the like; trivalent metals (ions) such as aluminum or the like; and other metals (ions) such as tin, zirconium, or the like. Among these metals (ions), sodium, zinc and magnesium (ions) are preferably used because they provide excellent resilience, durability, or the like.

The degree of neutralization of the carboxylic groups contained in the binary ionomer resin is preferably 20 mole % or more, more preferably 30 mole % or more, and is preferably 90 mole % or less, more preferably 85 mole % or less. If the degree of neutralization is 20 mole % or more, the intermediate layer has a better resilience and durability. If the degree of neutralization is 90 mole % or less, the fluidity of the intermediate layer composition becomes better (resulting in good moldability). It is noted that the degree of neutralization of the carboxylic groups in the ionomer resin can be calculated by the following mathematical expression 1.

Degree of neutralization(mol %)=(the number of moles of carboxylic groups neutralized in the ionomer resin/the number of moles of all carboxylic groups contained in the ionomer resin)× 100  [Mathematical Expression 1]

Specific examples of the binary ionomer resin include trade name "Himilan® (e.g. Himilan 1555 (Na), Himilan 1557 (Zn), Himilan 1605 (Na), Himilan 1706 (Zn), Himilan 1707 (Na), Himilan AM 7329 (Zn), Himilan AM7311 (Mg))" commercially available from Du Pont-Mitsui Polychemicals Co., Ltd.

Further, examples include "Surlyn® (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li))" commercially available from E.I. du Pont de Nemours and Company.

Further, examples include "Iotek (registered trademark) (e.g. Iotek 8000 (Na), Iotek 8030 (Na), Iotek 7010 (Zn), Iotek 7030 (Zn))" commercially available from ExxonMobil Chemical Corporation.

The binary ionomer resins may be used alone or as a mixture of at least two of them. It is noted that Na, Zn, Li, and Mg described in the parentheses after the trade names indicate metal types of neutralizing metal ions for the metal-neutralized copolymer.

The flexural modulus of (B) the binary ionomer resin is preferably 300 MPa or more, more preferably 310 MPa or more, and even more preferably 330 MPa or more, and is preferably 600 MPa or less, more preferably 550 MPa or less, and even more preferably 500 MPa or less. If the flexural modulus of (B) the binary ionomer resin is too low, the elastic modulus of the intermediate layer becomes low, and the effects of increasing the launch angle and reducing the spin rate become small. On the other hand, if the flexural modulus of (B) the binary ionomer resin is too high, the elastic modulus of the intermediate layer becomes excessively high, and the durability and the shot feeling of the golf ball tend to deteriorate.

The melt flow rate (190° C., 2.16 kg) of the binary ionomer resin is preferably 1.0 g/10 min or more, more preferably 1.5 g/10 min or more, and even more preferably 2.0 g/10 min or more, and is preferably 30 g/10 min or less, more preferably 25 g/10 min or less, and even more preferably 20 g/10 min or less. If the melt flow rate (190° C., 2.16 kg) of the binary ionomer resin is 1.0 g/10 min or more, the fluidity of the intermediate layer composition becomes good, and it is possible to make a thin-walled intermediate layer. Thus, the spin rate when hitting a driver shot is reduced to give a great flight distance. If the melt flow rate (190° C., 2.16 kg) of the binary ionomer resin is 30 g/10 min o less, the durability of the obtained golf ball becomes better.

The binary ionomer resin preferably has a slab hardness of 65 or more, more preferably 66 or more, even more preferably 67 or more, and preferably has a slab hardness of 80 or less, more preferably 75 or less, even more preferably 70 or less in Shore D hardness. If the slab hardness of the binary ionomer resin is 65 or more in Shore D hardness, the intermediate layer becomes harder and thus the effect of the high launch angle and low spin rate becomes larger. If the slab hardness of the binary ionomer resin is 80 or less in Shore D hardness, the intermediate layer does not become excessively hard and the durability of the golf ball becomes better.

(C) Other Thermoplastic Resins than (A) Component and (B) Component

The intermediate layer composition used in the present invention may further comprise (C) other thermoplastic resins than (A) component and (B) component, in addition to (A) component and (B) component. Examples of (C) component include polyurethane, polyolefin, polyester, polyamide, polystyrene, polycarbonate, polyacetal, modified poly(phenyleneether), polyimide, polysulfone, polyethersulfone, poly(phenylenesulfide), polyarylate, polyamideimide, polyetherimide, polyetheretherketone, polyetherketone, polytetrafluororoethylene, polyaminobismaleimide, polybisamidetriazole, an acrylonitrile-butadiene-styrene copolymer, an acrylonitrile-styrene copolymer, an acrylonitrile-EPDM-styrene copolymer.

Specific examples of (C) component are a thermoplastic polyamide elastomer having a trade name "Pebax® (e.g. "Pebax 2533")" commercially available from Arkema Inc., a thermoplastic polyurethane elastomer having a trade name "Elastollan® (e.g. "Elastollan XNY85A")" commercially available from BASF Japan Ltd., a thermoplastic polyester elastomer having a trade name "Hytrel® (e.g. "Hytrel 3548" and "Hytrel 4047")" commercially available from Du Pont-Toray Co., Ltd., a thermoplastic polystyrene elastomer having a trade name "Rabalon® (e.g. "Rabalon T3221C")" commercially available from Mitsubishi Chemical Corporation, or the like.

In the present invention, the intermediate layer composition contains, as a resin component, (A) the modified polyester elastomer in an amount of 30 mass % to 70 mass %, (B) the binary ionomer resin in an amount of 70 mass % to 30 mass %, and (C) component in an amount of 0 mass % to 50 mass %, provided that a total content of (A) component, (B) component, and (C) component is 100 mass %. The contents of (A) component and (B) component preferably range from 35 mass % to 65 mass %, more preferably from 40 mass % to 60 mass %, respectively. If the contents of (A) component and (B) component fall within the above range, the intermediate layer has an appropriate rigidity and the golf ball has the high launch angle and low spin rate. Therefore, the golf ball travels a great distance. In addition, the shot feeling is improved.

The content of (C) component in the intermediate layer composition is preferably 0.1 mass % or more, more preferably 0.15 mass % or more, even more preferably 0.2 mass % or more, and is preferably 50 mass % or less, more preferably 45 mass % or less, even more preferably 40 mass % or less. If the content of (C) component falls within the above range, the intermediate layer composition has a desired hardness without lowering the mechanical properties.

The intermediate layer composition may further contain pigment components such as a white pigment (for example, titanium oxide) and a blue pigment; a mass adjusting agent; a dispersant; an antioxidant; an ultraviolet absorber; a light stabilizer; a fluorescent material or a fluorescent brightener or the like, as long as the performance of the golf ball of the present invention does not deteriorate.

Examples of the mass adjusting agent are metals such as gold, tungsten, molybdenum, lead, copper, iron, cast iron, pig iron, zinc, titanium, aluminum, zirconium; metal oxides such as aluminum oxide, bismuth oxide, cerium oxide, copper oxide, tin oxide, titanium oxide, yttrium oxide, zinc oxide, silica; barium sulfate; calcium carbonate; talc; montmorillonite; and mica. The mass adjusting agent may be used alone or in combination of two or more of them.

The blending amount of the mass adjusting agent is preferably 1 part by mass or more, more preferably 2 parts by mass or more, even more preferably 3 parts by mass or more, and is preferably 50 parts by mass or less, more preferably 47 parts by mass or less, even more preferably 44 parts by mass or less. If the blending amount of the mass adjusting agent is 1 part by mass or more, the density of the intermediate layer can be more easily adjusted. If the blending amount is 50 parts by mass or less, the dispersibility of the mass adjusting agent into the resin component becomes better.

The intermediate layer composition can be obtained by dry blending (A) the modified polyester elastomer and (B) the binary ionomer resin, followed by extruding and pelletizing. The dry blending may be carried out using for example, a mixer capable of blending a raw material in the form of pellet, more preferably a tumbler type mixer. In addition to the dry blending, the materials may be supplied respectively by the respective feeding machines. Extruding can be carried out by publicly known extruders such as a single-screw kneading extruder, a twin-screw kneading extruder, and a twin-single kneading extruder. The extruding condition is not particularly limited. For example, in the case of extruding with a twin-screw kneading extruder, the preferable conditions are screw diameter=45 mm; screw revolutions=50 rpm to 400 rpm; screw L/D=35 or less, and die temperature; 140° C. to 250° C. If desired, the modification of the polyester elastomer and the blending of the binary ionomer resin with the resultant modified polyester elastomer can be conducted at the same time by adding the binary ionomer resin as well as the radical generator and the unsaturated carboxylic acid to the polyester elastomer when preparing (A) the modified polyester elastomer.

The melt flow rate (230° C., 2.16 kg) of the intermediate layer composition is preferably 3 g/10 min or more, more preferably 5 g/10 min or more, and even more preferably 7 g/10 min or more, and is preferably 30 g/10 min or less, more preferably 27 g/10 min or less, and even more preferably 25 g/10 min or less. If the melt flow rate is 3 g/10 min or more, since the moldability of the intermediate layer is enhanced, it is easier to make a thin-walled intermediate layer.

The intermediate layer composition preferably has a flexural modulus of 150 MPa or more, more preferably 155 MPa or more, even more preferably 160 MPa or more, and preferably has a flexural modulus of 450 MPa or less, more preferably 430 MPa or less, even more preferably 400 MPa or less. If the flexural modulus of the intermediate layer composition is 150 MPa or more, it is possible to make the golf ball have an outer-hard and inner soft structure, resulting in a great flight distance. If the flexural modulus is 450 MPa or less, the obtained golf ball becomes appropriately soft and the shot feeling becomes better.

The intermediate layer composition preferably has a rebound resilience of 55% or more, more preferably 56% or more, even more preferably 57% or more. If the rebound resilience of the intermediate layer composition is 55% or more, the obtained golf ball travels a great distance. Herein, the flexural modulus and the rebound resilience are the flexural modulus and the rebound resilience of the intermediate layer composition molded into a sheet form and are measured by a method described later.

The intermediate layer composition preferably has a maximum loss factor (tan δ) of 0.08 or less, more preferably 0.07 or less, even more preferably 0.06 or less, and preferably has a maximum loss factor (tan δ) of 0.01 or more, more preferably 0.02 or more, even more preferably 0.03 or more, between −20° C. and 0° C. If the maximum value of the loss factor (tan δ) between −20° C. and 0° C. falls within the above range, the desirable resilience is obtained.

The intermediate layer composition preferably has a slab hardness of 40 or more, more preferably 41 or more, even more preferably 42 or more, and preferably has a slab hardness of 60 or less, more preferably 59 or less, even more preferably 58 or less in Shore D hardness. If the intermediate layer composition has the slab hardness of 40 or more in Shore D hardness, the intermediate layer has higher rigidity and the golf ball having more excellent resilience (distance) is obtained. On the other hand, if the intermediate layer composition has the slab hardness of 60 or less in Shore D hardness, the obtained golf ball has higher durability. Herein, the slab hardness of the intermediate layer means the hardness of the intermediate layer composition molded into a sheet form and is measured by a later described method.

The melt flow rate, flexural modulus, rebound resilience, and slab hardness of the intermediate layer composition can be adjusted by appropriately selecting kinds, content or the like of (A) component, (B) component and (C) component.

(2) Center Composition

For the center of the golf ball of the present invention, a conventionally known rubber composition (hereinafter simply referred to as "center rubber composition" occasionally) may be employed, and it can be molded by, for example, heat-pressing a rubber composition containing a base rubber, a crosslinking initiator, a co-crosslinking agent, and a filler.

As the base rubber, a natural rubber and/or a synthetic rubber such as a polybutadiene rubber, a natural rubber, a polyisoprene rubber, a styrene polybutadiene rubber, and ethylene-propylene-diene terpolymer (EPDM) may be used. Among them, typically preferred is the high cis-polybutadiene having cis-1,4-bond in a proportion of 40% or more, more preferably 70% or more, even more preferably 90% or more in view of its superior repulsion property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.3 part by mass or more, more preferably 0.4 part by mass or more, and is preferably 5 parts by mass or less, more preferably 3 parts by mass or less based on 100 parts by mass of the base rubber. If the amount is less than 0.3 part by mass, the center becomes too soft, and the resilience tends to be lowered, and if the amount is more than 5 parts by mass, the amount of the co-crosslinking agent must be increased in order to obtain the appropriate hardness, and thus the resilience is likely to be lowered.

The co-crosslinking agent is not particularly limited as long as it has the effect of crosslinking a rubber molecule by graft polymerization with a base rubber molecular chain; for example, $\alpha,\beta$-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience.

The amount of the co-crosslinking agent to be used is preferably 10 parts or more, more preferably 15 parts or more, even more preferably 20 parts or more, and is preferably 55 parts or less, more preferably 50 parts or less, even more preferably 48 parts or less based on 100 parts of the base rubber by mass. If the amount of the co-crosslinking agent to be used is less than 10 parts by mass, the amount of the crosslinking initiator must be increased to obtain an appropriate hardness, which tends to lower the resilience. On the other hand, if the amount of the co-crosslinking agent to be used is more than 55 parts by mass, the center becomes too hard, so that the shot feeling may be lowered.

The filler contained in the center rubber composition is mainly blended as a specific gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 0.5 part or more, more preferably 1 part or more, and preferably 30 parts or less, more preferably 20 parts or less based on 100 parts of the base rubber by mass. If the amount of the filler to be blended is less than 0.5 part by mass, it becomes difficult to adjust the weight, while if it is more than 30 parts by mass, the weight ratio of the rubber component becomes small and the resilience tends to be lowered.

As the center rubber composition, an organic sulfur compound, an antioxidant or a peptizing agent may be blended appropriately in addition to the base rubber, the crosslinking initiator, the co-crosslinking agent and the filler.

As the organic sulfur compound, diphenyl disulfide or a derivative thereof may be preferably used. Examples of the diphenyl disulfide or the derivative thereof include diphenyl disulfide; a mono-substituted diphenyl disulfide such as bis (4-chlorophenyl)disulfide, bis(3-chlorophenyl)disulfide, bis (4-bromophenyl)disulfide, bis(3-bromophenyl)disulfide, bis (4-fluorophenyl)disulfide, bis(4-iodophenyl)disulfide and bis (4-cyanophenyl)disulfide; a di-substituted diphenyl disulfide such as bis(2,5-dichlorophenyl)disulfide, bis(3,5-dichlorophenyl)disulfide, bis(2,6-dichlorophenyl)disulfide, bis(2,5-dibromophenyl)disulfide, bis (3,5-dibromophenyl)disulfide, bis(2-chloro-5-bromophenyl)disulfide, and bis(2-cyano-5-bromophenyl)disulfide; a tri-substituted diphenyl disulfide such as bis (2,4,6-trichlorophenyl)disulfide, and bis (2-cyano-4-chloro-6-bromophenyl)disulfide; a tetra-substituted diphenyl disulfide such as bis(2,3,5,6-tetra chlorophenyl)disulfide; a penta-substituted diphenyl disulfide such as bis (2,3,4,5,6-pentachlorophenyl)disulfide and bis(2,3,4,5,6-pentabromophenyl)disulfide. These diphenyl disulfides or the derivative thereof can enhance resilience by having some influence on the state of vulcanization of vulcanized rubber. Among them, diphenyl disulfide and bis(pentabromophenyl) disulfide are preferably used since a golf ball having particularly high resilience can be obtained. The amount of the diphenyl disulfide or the derivative thereof to be blended is preferably 0.1 part by mass or more, more preferably 0.3 part by mass or more, and is preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

(3) Cover Composition

The cover of the golf ball of the present invention is formed from a cover composition containing a resin component. Examples of the resin components include an ionomer resin, a thermoplastic polyamide elastomer having a trade name "Pebax® (e.g. "Pebax 2533")" commercially available from Arkema Inc., a thermoplastic polyester elastomer having a trade name "Hytrel® (e.g. "Hytrel 3548" and "Hytrel 4047")" commercially available from Du Pont-Toray Co., Ltd., a thermoplastic polyurethane elastomer having a trade name "Elastollan® (e.g. "Elastollan XNY97A")" commercially available from BASF Japan Ltd., a thermoplastic polystyrene elastomer having a trade name "Rabalon®" commercially available from Mitsubishi Chemical Corporation, and the like. These resin components may be used alone or in combination of two or more thereof.

The cover composition constituting the cover of the golf ball of the present invention preferably contains polyurethane or an ionomer resin as a resin component. The content of the polyurethane or an ionomer resin in the resin component of the cover composition is preferably 50 mass % or more, more preferably 60 mass % or more, even more preferably 70 mass % or more.

The cover composition may contain a pigment component such as a white pigment (for example, titanium oxide), a blue pigment, a red pigment, or the like, a specific gravity adjusting agent such as zinc oxide, calcium carbonate, barium sulfate, or the like, a dispersant, an antioxidant, an ultraviolet absorber, a light stabilizer, a fluorescent material or a fluorescent brightener, or the like as long as they do not impair the performance of the cover.

The amount of the white pigment (for example, titanium oxide), with respect to 100 parts by mass of the resin component for forming the cover, is preferably 0.5 part by mass or more and more preferably 1 part by mass or more, and is preferably 10 parts by mass or less and more preferably 8 parts by mass or less. If the amount of the white pigment is 0.5 part by mass or more, it is possible to provide opacity to the cover. If the amount of the white pigment is more than 10 parts by mass, the durability of the resultant cover may deteriorate.

(4) Process for Producing Golf Ball

The center can be obtained by mixing, kneading the above mentioned rubber composition and molding the rubber composition in the mold. The conditions for press-molding the center rubber composition should be determined depending on the rubber composition. Specifically, the press-molding is preferably carried out for 10 to 60 minutes at the temperature of 130° C. to 200° C. under the pressure from 2.9 MPa to 11.8 MPa. Alternatively, the press-molding is preferably carried out in a two-step heating, for example, for 20 to 40 minutes at the temperature of 130° C. to 150° C., and continuously for 5 to 15 minutes at the temperature of 160° C. to 180° C.

One example of the process for forming the intermediate layer is to cover the center with the intermediate layer composition to form an intermediate layer. The process for forming the intermediate layer is not particularly limited. In one embodiment, the intermediate layer composition is molded into hemispherical half shells in advance, and then the center is covered with two half shells and press-molded at the temperature of 130° C. to 170° C. for 1 to 5 minutes. In another embodiment, the intermediate layer composition is injection-molded directly onto the center so as to cover the center.

In the case of directly injection molding the intermediate layer composition onto the center, it is preferred to use upper and lower molds for forming the intermediate layer having a spherical cavity and pimples, wherein a part of the pimple also serves as a retractable hold pin. When forming the intermediate layer by injection molding, the hold pin is protruded to hold the center, and the intermediate layer composition which has been heated and melted is charged and then cooled to obtain the intermediate layer. For example, the intermediate layer composition heated and melted at the temperature of 150° C. to 230° C. is charged into a mold held under the pressure of 980 KPa to 1,500 KPa for 0.1 to 1 second. After cooling for 15 to 60 seconds, the mold is opened.

When molding the intermediate layer in a compression molding method, molding of the half shell can be performed by either compression molding method or injection molding method, and the compression molding method is preferred. The compression-molding of the intermediate layer composition into half shell can be carried out, for example, under a pressure of 1 MPa or more and 20 MPa or less at a temperature of −20° C. or more and 70° C. or less relative to the flow beginning temperature of the intermediate layer composition. By performing the molding under the above conditions, a half shell having a uniform thickness can be formed. Examples of a method for molding the intermediate layer using half shells include compression molding by covering the center with two half shells. The compression molding of half shells into the intermediate layer can be carried out, for example, under a pressure of 0.5 MPa or more and 25 MPa or less at a temperature of −20° C. or more and 70° C. or less relative to the flow beginning temperature of the intermediate layer composition. By performing the molding under the above conditions, the intermediate layer having a uniform thickness can be formed.

The molding temperature means the highest temperature where the temperature at the surface of the concave portion of the lower mold reaches from closing through opening the molds. Further, the flow beginning temperature of the cover material can be measured in a pellet form with the following conditions by using a flow characteristics evaluation apparatus (Flow Tester CFT-500D, manufactured by Shimadzu Corporation).

Measuring conditions: Area size of a plunger: 1 $cm^2$, Die length: 1 mm, Die diameter: 1 mm, Load: 588.399 N, Start temperature: 30° C., and Temperature increase rate: 3° C./min.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

When molding the cover in a compression molding method, molding of the half shell can be performed by either compression molding method or injection molding method, and the compression molding method is preferred. The compression-molding of the cover composition into a half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a cover for a golf ball having a uniform thickness can be formed.

In the case of directly injection molding the cover composition onto the core, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 200° C. to 250° C. is charged into a mold held under the pressure of 9 MPa to 15 MPa for 0.5 to 5 second. After cooling for 10 to 60 seconds, the mold is opened and the golf ball with the cover molded is taken out from the mold. When molding a cover, the concave portions called "dimple" are usually formed on the surface.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 25 μm or smaller, and more preferably 18 μm or smaller. If the thickness is smaller than 5 μm, the paint film is easy to wear off due to continued use of the golf ball, and if the thickness is larger than 25 μm, the effect of the dimples is reduced, resulting in deteriorating flying performance of the golf ball.

(5) Golf Ball Construction

The golf ball of the present invention has no limitation on a construction thereof, as long as it comprises a center, a cover and an intermediate layer disposed between the center and the cover. Specific examples of the golf ball of the present invention include a three-piece golf ball comprising a core consisting of a center and a single-layered intermediate layer disposed around the center, and a cover covering the core; and a multi-piece golf ball comprising a core consisting of a center and at least two intermediate layers disposed around the center, and a cover covering the core. In a multi-piece golf ball having at least two intermediate layers, the intermediate layer in contact with the cover may be referred to as "an inner cover layer", and the intermediate layer in contact with the center may be referred to as "a surrounding layer". It is noted that a constituting member consisting of the center and the intermediate layer is merely referred to as "core".

In the followings, the preferable embodiments of the present invention will be described, referring to the drawings.

Figure 1:
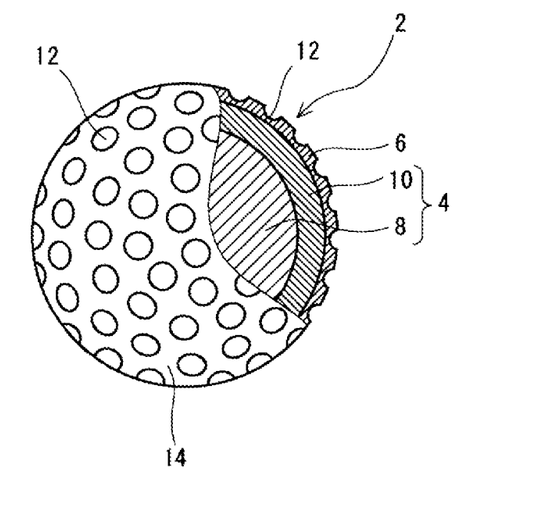
FIG. 1 is a schematic cross sectional view illustrating an embodiment of the golf ball of the present invention.

FIG. 1 is a partially cutaway sectional view showing the golf ball 2 according to the preferable embodiment of the present invention. The golf ball 2 comprises a spherical center 8, a cover 6, and an intermediate layer 10 disposed between the spherical center 8 and the cover 6. The core 4 consists of the spherical center 8 and the intermediate layer 10. Plurality of dimples 12 are formed on a surface of the cover 6. Other portions than dimples 12 on the surface of the golf ball 2 are land 14. The golf ball 2 is provided with a paint layer and a mark layer outside the cover 6, but these layers are not depicted.

The center generally has the spherical shape, but the center may be provided with a rib on the surface thereof so that the surface of the spherical center is divided by the ribs. The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east (west), assuming that the meridian as the standard is at longitude 0 degree. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

In light of the durability, the central hardness H1$c$ of the center 8 is preferably 25 or more, more preferably 30 or more, and even more preferably 35 or more in Shore D hardness. In light of suppression of the spin, the central hardness H1$c$ is preferably 55 or less, more preferably 50 or less, and even more preferably 45 or less in Shore D hardness. The central hardness H1$c$ is measured by pressing a Shore D type hardness scale at a central point of a cut plane of the hemisphere obtained by cutting the center 8. For the measurement, a type LA1 auto loading durometer manufactured by Kobunshi Keiki Co., Ltd., provided with a Shore D type spring hardness tester is used.

In light of the resilience performance, the surface hardness H1$s$ of the center 8 is preferably 35 or more, more preferably 40 or more, and even more preferably 45 or more in Shore D hardness. In light of the shot feeling, the surface hardness H1$s$ is preferably 65 or less, more preferably 60 or less, and even more preferably 55 or less in Shore D hardness. The surface hardness H is measured by pressing the Shore D type hardness scale against the surface of the center 8. For the measurement, a type LA1 auto loading durometer manufactured by Kobunshi Keiki Co., Ltd., provided with a Shore D type spring hardness tester is used.

In light of suppression of the spin, the difference (H1$s$–H1$c$) between the surface hardness H1$s$ and the central hardness H1$c$ is preferably 7 or more, more preferably 10 or more, and even more preferably 13 or more in Shore D hardness. In light of the durability of the golf ball 2, the difference (H1$s$–H1$c$) is preferably 25 or less, more preferably 20 or less, and even more preferably 16 or less in Shore D hardness.

The center 8 preferably has a density G1 of 1.18 g/cm$^3$ or less. This center 8 enables the mass distribution of the golf ball 2 to have a disproportionate pattern indicating greater weighing in the outer part. The spin may be suppressed owing to such disproportion. In this respect, the density G1 is more preferably 1.14 g/cm$^3$ or less, and even more preferably 1.09 g/cm$^3$ or less. The density G1 is preferably 1.00 g/cm$^3$ or more.

In light of the shot feeling, the compression deformation amount of the center 8 is preferably 3.3 mm or more, more preferably 3.5 mm or more, and even more preferably 3.8 mm or more. In light of the resilience performance, the compression deformation amount is preferably 7.0 mm or less, more preferably 5.0 mm or less, and even more preferably 4.5 mm or less.

Upon measurement of the compression deformation amount, the spherical body (center 8, core 4 or golf ball 2) is placed on a hard plate made of metal. A cylinder made of metal gradually descends toward the spherical body. The spherical body intervened between the bottom face of the cylinder and the hard plate is deformed. A migration distance of the cylinder, starting from the state in which an initial load of 98 N is applied to the spherical body up to the state in which a final load of 1275 N is applied thereto is the compression deformation amount.

It is preferred that the center 8 has a diameter of 39.1 mm or more. This center 8 enables the intermediate layer 10 to be positioned away from the central point. As described later, the intermediate layer 10 has a large density. By positioning the intermediate layer 10 having a large density to be away from the central point, the mass distribution of the golf ball 2 can have a disproportionate pattern indicating greater weighing in the outer part. The spin may be suppressed owing to such disproportion. In this respect, the diameter of the center is more preferably 39.3 mm or more, and even more preferably 39.5 mm or more. In light of capability of molding of the intermediate layer 10 having a sufficient thickness, the diameter of the center is preferably 41 mm or less.

The mass W1 of the center 8 is preferably 32 g or greater and 39 g or less. The center 8 may be composed of two or more layers.

In light of the resilience performance, the hardness H2 of the intermediate layer 10 is preferably 40 or more, more preferably 41 or more, and even more preferably 42 or more in Shore D hardness. In light of the shot feeling, the hardness H2 is preferably 60 or less, and more preferably 59 or less in Shore D hardness. The hardness H2 may be measured in accordance with a standard of "ASTM-D 2240-68" by using a type LA1 auto loading durometer manufactured by Kobunshi Keiki Co., Ltd., provided with a Shore D type spring hardness tester. For the measurement, a slab formed by hot pressing to have a thickness of about 2 mm is used. The slab which has been stored at a temperature of 23° C. for two weeks is used for the measurement. When the measurement is carried out, three pieces of the slab are overlaid. A slab formed from a resin composition that is the same as the resin composition of the intermediate layer 10 is used in the measurement.

The intermediate layer 10 has a density G2 of 1.00 g/cm$^3$ or more. This intermediate layer 10 allows the mass distribution of the golf ball 2 to have a disproportionate pattern indicating greater weighing in the outer part. The spin may be suppressed owing to such disproportion. In this respect, the density G2 is more preferably 1.10 g/cm$^3$ or more, and even more preferably 1.15 g/cm$^3$ or more, even more preferably 1.20 g/cm$^3$ or more. The density G2 is preferably 2.0 g/cm$^3$ or less.

In light of the possibility that the mass distribution of the golf ball 2 can have a disproportionate pattern indicating greater weighing in the outer part, the intermediate layer 10 has a thickness of preferably 0.5 mm or more, more preferably 0.7 mm or more, and even more preferably 0.8 mm or more. In light of possible formation of the center 8 having a sufficient diameter, the thickness is preferably 1.2 mm or less, and more preferably 1.0 mm or less.

In light of the possibility that the mass distribution of the golf ball 2 can have a disproportionate pattern indicating greater weighing in the outer part, the intermediate layer 10 preferably has a volume V2 of 3.5 cm$^3$ or more, more preferably 3.8 cm$^3$ or more, and even more preferably 4.1 cm$^3$ or more. In light of the possibility that the center 8 having a sufficient diameter can be provided, the volume V2 is preferably 5 cm$^3$ or less.

In light of the possibility that the mass distribution of the golf ball 2 can have a disproportionate pattern indicating greater weighing in the outer part, the intermediate layer 10 preferably has mass W2 of 4.5 g or more, more preferably 4.6 g or more, and even more preferably 4.7 g or more. In light of the possibility that the center 8 having a sufficient diameter can be provided, the mass W2 is preferably 7 g or less.

As described above, the core 4 consists of the center 8 and the intermediate layer 10. In light of the possibility that the mass distribution of the golf ball 2 can have a disproportionate pattern indicating greater weighing in the outer part, the core 4 preferably has a diameter of 40.7 mm or more, more preferably 40.9 mm or more, and even more preferably 41.1 mm or more. The diameter is preferably 42.2 mm or less.

In light of the shot feeling, the compression deformation amount of the core 4 is preferably 3.2 mm or more, more preferably 3.4 mm or more, and even more preferably 3.7 mm or more. In light of the resilience performance, the compression deformation amount is preferably 6.5 mm or less, more preferably 4.8 mm or less, and even more preferably 4.3 mm or less.

In light of suppression of the spin, the hardness H3 of the cover 6 is preferably 57 or more, more preferably 59 or more, and even more preferably 61 or more in Shore D hardness. In light of the shot feeling, the hardness H3 is preferably 66 or less, and more preferably 64 or less in Shore D hardness. The hardness H3 may be measured in accordance with a standard of "ASTM-D 2240-68" by using a type LA1 auto loading durometer manufactured by Kobunshi Keiki Co., Ltd., provided with a Shore D type spring hardness tester. For the measurement, a slab formed by hot pressing to have a thickness of about 2 mm is used. The slab which has been stored at a temperature of 23° C. for two weeks is used for the measurement. When the measurement is carried out, three pieces of the slab are overlaid. A slab formed from a resin composition that is the same as the resin composition of the cover 6 is used in the measurement.

In light of suppression of the spin, the cover 6 preferably has a density G3 of 0.97 g/cm$^3$ or more, and more preferably 1.00 g/cm$^3$ or more. In light of the moldability of the cover 6, the density G3 is preferably 1.20 g/cm$^3$ or less, and more preferably 1.15 g/cm$^3$ or less.

In light of ease in molding of the cover 6, this cover 6 preferably has a thickness of 0.3 mm or more, and more preferably 0.4 mm or more. In light of the possibility that the intermediate layer 10 can be disposed in the outer part, the thickness of the cover is preferably 1.0 mm or less, more preferably 0.9 mm or less, and even more preferably 0.8 mm or less.

In light of the durability of the golf ball 2, the cover 6 preferably has a volume V3 of 3.2 cm$^3$ or more and more preferably 4.0 cm$^3$ or more. In light of the possibility that the intermediate layer 10 having a sufficient thickness can be provided, the volume V3 is preferably 6.2 cm$^3$ or less, and more preferably 5.2 cm$^3$ or less.

In light of the durability of the golf ball 2, the cover 6 preferably has mass W3 of 3.0 g or more, and more preferably 4.0 g or more. In light of the possibility that the intermediate layer 10 having a sufficient thickness can be provided, the mass W3 is preferably 6.0 g or less, and more preferably 5.0 g or less.

In light of the shot feeling, the compression deformation amount of the golf ball 2 is preferably 2.5 mm or more, more preferably 2.7 mm or more, and even more preferably 2.9 mm or more. In light of the resilience performance, the compression deformation amount is preferably 3.8 mm or less, more preferably 3.5 mm or less, and even more preferably 3.4 mm or less.

In this golf ball 2, the mass W2 of the intermediate layer 10 is greater than the mass W3 of the cover 6. This means that the intermediate layer 10 has a sufficiently large density G2, and the cover 6 has a thickness small enough. In this golf ball 2, the mass distribution has a disproportionate pattern indicating greater weighing in the outer part. Suppression of the back spin and the side spin can be achieved in this golf ball 2. Due to a small back spin rate, a great flight distance of the golf ball 2 can be attained. Due to a small side spin rate, variation in the flight direction of the golf ball 2 can be avoided. In this respect, the difference (W2−W3) is preferably 0.5 g or more, more preferably 0.8 g or more, and even more preferably 1.1 g or more. The difference (W2−W3) is preferably 3 g or less.

The total mass (W2+W3) of the mass W2 of the intermediate layer 10 and the mass W3 of the cover 6 is greater than 8.4 g and less than 12.0 g. In the golf ball 2 having the total mass (W2+W3) of greater than 8.4 g, the part other than the center 8 has sufficient rigidity. The sufficient rigidity can suppress the spin. In this respect, the total mass (W2+W3) is more preferably 8.6 g or more, and even more preferably 9.0 g or more. In the golf ball 2 having the total mass (W2+W3) of less than 12.0 g, the center 8 having a sufficient diameter can be formed. This center 8 is responsible for the resilience performance. In this respect, the total mass (W2+W3) is more preferably 11.5 g or less, and even more preferably 11.0 g or less.

The total volume (V2+V3) of the volume V2 of the intermediate layer 10 and the volume V3 of the cover 6 is 10.0 cm$^3$ or less. In the golf ball 2 having the total volume (V2+V3) of 10.0 cm$^3$ or less, the mass distribution can have a disproportionate pattern indicating greater weighing in the outer part. This disproportion suppresses the back spin and the side spin. In this respect, the total volume (V2+V3) is preferably 9.8 cm$^3$ or less, and more preferably 9.5 cm$^3$ or less. The total volume (V2+V3) is preferably 6.7 cm$^3$ or more.

In light of the possibility that the mass distribution can have a disproportionate pattern indicating greater weighing in the outer part, the difference (G2−G1) between the density G2 of the intermediate layer 10 and the density G1 of the center 8 is preferably 0.01 g/cm$^3$ or more, more preferably 0.03 g/cm$^3$ or more, and even more preferably 0.05 g/cm³ or more. The difference (G2−G1) is preferably 0.20 g/cm³ or less.

The total number of the dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them.

EXAMPLES

Hereinafter, the present invention will be described in detail by way of example. The present invention is not limited to examples described below. Various changes and modifications can be made without departing from the spirit and scope of the present invention.

(1) Hardness of Center (Shore D Hardness)

A type P1 auto loading durometer manufactured by Kobunshi Keiki Co., Ltd., provided with a Shore D type spring hardness tester prescribed in ASTM-D2240 standard was used to measure the surface hardness H1s of the center. Shore D hardness measured at the surfaces of the center was used as the surface hardness H1s of the center. The center was cut into two hemispheres to obtain a cut plane, and a Shore D hardness measured at the central point of the cut plane was used as the central hardness H1c of the center.

(2) Slab Hardness (Shore D, Shore A Hardness)

Sheets with a thickness of about 2 mm were produced by injection molding a cover composition or the intermediate layer composition, and stored at 23° C. for two weeks. Three or more of these sheets were stacked on one another so as not to be affected by the measuring base on which the sheets were placed, and the stack was measured with a type LA1 auto loading durometer manufactured by Kobunshi Keiki Co., Ltd., provided with a Shore D or Shore A type spring hardness tester.

(3) Compression Deformation Amount (mm)

A compression deformation amount of the center, core or golf ball (a shrinking amount of the center, core or golf ball in the compression direction thereof), when applying an initial load of 98 N to a final load of 1275 N, was measured.

(4) Melt Flow Rate (MFR) (g/10 min)

The MFR was measured using a flow tester (Shimadzu flow tester CFT-100C manufactured by Shimadzu Corporation) in accordance with JIS K7210. The measurement was conducted under the conditions of the measurement temperature 190° C. or 230° C. and the load of 2.16 kg.

(5) Flexural Modulus (MPa) (3 Points Bending Test, MPa)

Sheets having a thickness about 2 mm were produced by heat-pressing the ionomer resin or the intermediate layer composition, and stored at 23° C. for two weeks. The flexural modulus was measured according to JIS K7171. The measurement was conducted at a temperature of 23° C. and a humidity of 50% RH.

(6) Rebound Resilience (%)

A sheet with a thickness of about 2 mm was produced by a heat press molding from the intermediate layer composition. A circle-shaped test piece having a diameter of 28 mm was cut out of this sheet, and 6 pieces of the test piece were stacked to prepare a cylindrical test piece having a thickness of about 12 mm and a diameter of 28 mm. The cylindrical test piece was subjected to the Lupke type rebound resilience test (testing temperature 23° C., humidity 50 RH %). Preparation of the test piece and the testing method are based on JIS K6255.

(7) Durability

A metal-head W#1 driver was installed on a swing robot manufactured by TRUETEMPER CO, and the head speed was set to 45 m/sec. Each golf ball was stored in a constant temperature reservoir kept at the temperature of 23° C. for 12 hours, and then hit with a driver at the speed of 45 m/sec. immediately after the golf balls were taken out from the constant temperature reservoir. This procedure was repeated, and the number of hits required to break the golf ball was counted. The durability test was conducted twelve times for each golf ball. The number of hits for golf ball No. 15 was defined as an index of 100, and the durability of each golf ball was represented by converting the number of hits for each golf ball into this index. A greater index value indicates that the durability of the golf ball is excellent.

(8) Coefficient of Restitution

A 198.4 g of metal cylindrical object was forced to collide with each golf ball at a speed of 40 m/sec, and the speeds of the cylindrical object and the golf ball before and after the collision were measured. Based on these speeds and the mass of each object, coefficient of restitution for each golf ball was calculated. The measurement was conducted by using twelve of each golf ball, and the average value was regarded as the coefficient of restitution for the golf ball. The coefficient of restitution of golf ball No. 15 was defined as an index of 100.0, and the coefficient of restitution of each golf ball was represented by converting the coefficient of restitution of each golf ball into this index.

(9) Volume, Mass, Density of Center, Intermediate layer, Cover

Volumes of the center, intermediate layer, and the cover were calculated based on the diameter, and thickness thereof. Mass of the center was measured using a mass scale. The mass of the intermediate layer and the cover were calculated based on the mass before and after molding them, respectively. Density was calculated from volume and mass thereof.

(10) Measurement of Loss Factor (tan δ)

Sheets with a thickness of 0.5 mm were produced from the intermediate layer composition. Test pieces having a length of 30 mm, a width of 4 mm, and a thickness of 0.5 mm in a plate-like form were cut out from these sheets. The both ends of test pieces were clamed with chucks so that the length of displacement becomes 20 mm. The Loss factor was measured under the following conditions using Viscoelasticity spectrometer Rheogel-E4000 available from UBM CO., Ltd to determine the Maximum Loss Factor (tan δ) between −20° C. to 0° C.

Initial load: Auto static load 200%
Amplitude: 0.025%
Frequency: 10 Hz
Initial temperature: −100° C.
End temperature: 100° C.
Temperature increasing rate: 4° C./min
Measuring mode: tensile mode (11) Moldability Moldability was evaluated according to the following criteria.

G (Good): Molding was easier than the case of using the ionomer resin having a high degree of neutralization.

P (Poor): Molding was not easier than the case of using the ionomer resin having a high degree of neutralization.

[Preparation of Modified Polyester Elastomer]

(1) Modified Polyester Elastomer 1

100 parts by mass of a polyester elastomer containing 65 mass % of polytetramethylene glycol and 35 mass % of polybutylene terephthalate and 0.5 parts by mass of maleic anhydride (pulverized product), and 0.13 parts by mass of benzoyl peroxide (50% water-containing product, NYPER BWK) were mixed with a mixer, and extruded with a twin screw extruder (TEX54α manufactured by The Japan Steel Works, Ltd.) at the conditions of 200° C., 250 revolutions, and 250 kg/hr for a graft reaction of maleic anhydride to produce a modified polyester elastomer 1. The obtained modified polyester elastomer contained maleic acid component in a content of 0.4 mass %, Shore A hardness of 84, and a melt flow rate (230° C., 21N) of 24 g/10 min.

(2) Modified Polyester Elastomer 2

The modified polyester elastomer 2 was produced in the same manner as in Modified Polyester Elastomer 1 except for using a polyester elastomer containing 77 mass % of polytetramethylene glycol and 23 mass % of polybutylene terephthalate. The obtained modified polyester elastomer contained maleic acid component in a content of 0.5 mass %, Shore A hardness of 80, and a melt flow rate (230° C., 21N) of 30 g/10 min.

[Production of Golf Balls]

(1) Production of Center

Spherical centers were obtained by kneading rubber compositions having the formulations shown in Table 1, and heat-pressing the kneaded material in upper and lower molds, each having a hemispherical cavity, at 170° C. for 20 minutes.

TABLE 1

| | Center No. | A | B | C |
|---|---|---|---|---|
| Formulation | Polybutadiene Rubber | 100 | 100 | 100 |
| | Zinc acrylate | 28 | 28 | 28 |
| | Zinc oxide | 10 | 10 | 10 |
| | Diphenyl disulfide | 0.5 | 0.5 | 0.5 |
| | Dicumyl peroxide | 0.9 | 0.9 | 0.9 |
| | Barium Sulfate | 11.8 | 7.9 | 6.8 |
| Properties | Diameter (mm) | 39.6 | 39.6 | 39.6 |
| | Central hardness H1c (Shore D hardness) | 39 | 39 | 39 |
| | Surface hardness H1s (Shore D hardness) | 52 | 52 | 52 |
| | Density G1 (g/cm³) | 1.143 | 1.121 | 1.113 |

Formulation: parts by mass
Polybutadiene rubber: "BR-730 (high-cis polybutadiene)" manufactured by JSR Corporation
Zinc acrylate: "ZNDA-90S" manufactured by Nihon Jyoryu Kogyo Co., Ltd.
Zinc oxide: "Ginrei R" manufactured by Toho Zinc Co., Ltd.
Barium sulfate: "Barium Sulfate BD" manufactured by Sakai Chemical Industry Co., Ltd.
Dicumyl peroxide: "Percumyl (registered trademark) D" manufactured by NOF Corporation
Diphenyl disulfide: manufactured by Sumitomo Seika Chemicals Company Limited (2) Preparation of Cover Composition and Intermediate Layer Composition Blending materials shown in Tables 2 to 6 were mixed with a twin-screw kneading extruder to prepare cover compositions in the pellet form and intermediate layer compositions in the pellet form, respectively. The extruding conditions were a screw diameter of 45 mm, a screw rotational speed of 200 rpm, and screw L/D=35, and the mixtures were heated to 160 to 230° C. at the die position of the extruder.

TABLE 2

| Cover composition No. | | |
|---|---|---|
| Formulation | Himilan AM7329 | 70 |
| | Nucrel H1050 | 30 |
| | Titanium oxide | 3 |
| Properties | Density G3 (g/cm³) | 0.98 |
| | Slab hardness H3 (Shore D hardness) | 60 |

Formulation: parts by mass
Himilan AM7329: Zinc ion neutralized ethylene-methacrylic acid copolymer ionomer resin available from Du Pont-Mitsui Polychemicals Co., Ltd
Nucrel 1050H: ethylene-methacrylic acid copolymer (melt viscosity (190° C.) measured by a flow tester: 6 Pa · s, melt flow rate (190° C.*2.16 kg): 15 g/10 min) available from Du Pont-Mitsui Polychemicals Co., Ltd.

(3) Production of Golf Ball Body

A spherical core was produced by injection-molding the intermediate layer composition onto the center thus obtained to form an intermediate layer (thickness: 0.8 mm) covering the center. Then, a golf ball was produced by injection-molding the cover composition onto the spherical core to form a cover (thickness: 0.8 mm). Upper and lower molds have a spherical cavity with pimples, a part of which serves as a hold pin which is extendable and retractable.

When molding the intermediate layer, the hold pins were protruded to hold the center, the resin heated at 260° C. was charged into the mold under a pressure of 80 tons within 0.3 seconds, and cooled for 30 seconds. Then, the mold was opened, and the core was taken out from the mold.

When molding the cover, the hold pins were protruded to hold the center, the resin heated at 210° C. was charged into the mold under a pressure of 80 tons within 0.3 seconds, and cooled for 30 seconds. Then, the mold was opened, and the golf ball body was taken out from the mold. The surface of the obtained golf ball body was treated with sandblast, marked, and painted with a clear paint. The paint was dried in an oven at 40° C., and golf balls with a diameter of 42.8 mm and a mass of 45.4 g were obtained. The evaluation results of resilience, and compression deformation amount of the obtained golf ball are shown in Tables 3 to 6.

TABLE 3

| | | | | Golf ball No. | 1 | 2 | 3 | 4 |
|---|---|---|---|---|---|---|---|---|
| | | | | Center No. | B | C | C | C |
| Intermediate layer composition | Formulation | Resin Component | (A) | Modified Polyester Elastomer 1 | 40 | 40 | 40 | — |
| | | | | Modified Polyester Elastomer 2 | — | — | — | 40 |
| | | | | Slab hardness (Shore A) | 84 | 84 | 84 | 80 |
| | | | (B) | HPF1000 | — | — | — | — |
| | | | | Surlyn 8150 | 36 | 36 | 36 | 36 |
| | | | | Surlyn 8945 | — | — | — | — |
| | | | | Surlyn 9150 | 24 | 24 | — | 24 |
| | | | | Surlyn 9120 | — | — | 24 | — |
| | | | | Himilan AM7329 | — | — | — | — |
| | | | | Slab hardness (Shore D) | 68 | 68 | 68 | 68 |
| | | | | Flexural modulus (MPa) | 450 | 450 | 460 | 450 |
| | | | | MFR(190° C. × 2.16 kg, g/10 min) | 5 | 5 | 3.4 | 5 |
| | | | (C) | TPEE | — | — | — | — |

TABLE 3-continued

| | | Golf ball No. | 1 | 2 | 3 | 4 |
|---|---|---|---|---|---|---|
| | | Center No. | B | C | C | C |
| | Properties | Tungsten | 14 | 19 | 19 | 19 |
| | | Density G2 (g/cm³) | 1.15 | 1.20 | 1.20 | 1.20 |
| | | Slab hardness H2 (Shore D) | 57 | 57 | 57 | 54 |
| | | Flexural modulus (MPa) | 281 | 313 | 310 | 250 |
| | | Max Loss Factor (tan δ, −20° C. to 0° C.) | 0.05 | 0.05 | 0.05 | 0.05 |
| | | Rebound resilience (%) | 59 | 57 | 57 | 57 |
| Intermediate Layer | | Mass W2 (g) | 4.72 | 4.92 | 4.92 | 4.92 |
| | | Volume V2 (cm³) | 4.1 | 4.1 | 4.1 | 4.1 |
| Cover | | Mass W3 (g) | 4.34 | 4.34 | 4.34 | 4.34 |
| | | Volume V3 (cm³) | 4.43 | 4.43 | 4.43 | 4.43 |
| Golf | | W2 + W3 (g) | 9.06 | 9.26 | 9.26 | 9.26 |
| Ball | | V2 + V3 (cm³) | 8.53 | 8.53 | 8.53 | 8.53 |
| | | Coefficient of Restitution (Index) | 100.4 | 100.4 | 100.4 | 100.3 |
| | | Durability | 120 | 115 | 115 | 120 |
| | | Moldability | G | G | G | G |

Formulation: Parts by mass
MFR: Melt Flow Rate

TABLE 4

| | | | | Golf ball No. | 5 | 6 | 7 | 8 |
|---|---|---|---|---|---|---|---|---|
| | | | | Center No. | C | C | C | B |
| Intermediate layer composition | Formulation | Resin Component | (A) | Modified Polyester Elastomer 1 | — | 40 | 30 | 30 |
| | | | | Modified Polyester Elastomer 2 | 45 | — | — | — |
| | | | | Slab hardness (Shore A) | 80 | 84 | 84 | 84 |
| | | | (B) | HPF1000 | — | — | — | — |
| | | | | Surlyn 8150 | 33 | — | — | 36 |
| | | | | Surlyn 8945 | — | 36 | 42 | — |
| | | | | Surlyn 9150 | 22 | — | — | 24 |
| | | | | Surlyn 9120 | — | — | — | — |
| | | | | Himilan AM7329 | — | 24 | 28 | — |
| | | | | Slab hardness (Shore D) | 68 | 65 | 65 | 68 |
| | | | | Flexural modulus (MPa) | 450 | 330 | 330 | 450 |
| | | | | MFR(190° C. × 2.16 kg, g/10 min) | 5 | 5 | 5 | 5 |
| | | | (C) | TPEE | — | — | — | 10 |
| | Properties | | | Tungsten | 19 | 19 | 19 | 14 |
| | | | | Density G2 (g/cm³) | 1.20 | 1.20 | 1.20 | 1.15 |
| | | | | Slab hardness H2 (Shore D) | 52 | 54 | 56 | 57 |
| | | | | Flexural modulus (MPa) | 230 | 205 | 230 | 340 |
| | | | | Max Loss Factor (tan δ, −20° C. to 0° C.) | 0.05 | 0.05 | 0.05 | 0.05 |
| | | | | Rebound resilience (%) | 57 | 56 | 56 | 59 |
| Intermediate Layer | | | | Mass W2 (g) | 4.92 | 4.92 | 4.92 | 4.72 |
| | | | | Volume V2 (cm³) | 4.1 | 4.1 | 4.1 | 4.1 |
| Cover | | | | Mass W3 (g) | 4.34 | 4.34 | 4.34 | 4.34 |
| | | | | Volume V3 (cm³) | 4.43 | 4.43 | 4.43 | 4.43 |
| Golf | | | | W2 + W3 (g) | 9.26 | 9.26 | 9.26 | 9.06 |
| Ball | | | | V2 + V3 (cm³) | 8.53 | 8.53 | 8.53 | 8.53 |
| | | | | Coefficient of Restitution (Index) | 100.2 | 100.1 | 100.2 | 100.2 |
| | | | | Durability | 110 | 110 | 115 | 125 |
| | | | | Moldability | G | G | G | G |

Formulation: Parts by mass
MFR: Melt Flow Rat

TABLE 5

| | | | | Golf ball No. | 9 | 10 | 11 | 12 |
|---|---|---|---|---|---|---|---|---|
| | | | | Center No. | A | C | C | C |
| Intermediate layer composition | Formulation | Resin Component | (A) | Modified Polyester Elastomer 1 | 50 | 50 | 60 | — |
| | | | | Modified Polyester Elastomer 2 | — | — | — | — |
| | | | | Slab hardness (Shore A) | 84 | 84 | 84 | — |
| | | | (B) | HPF1000 | — | — | — | — |
| | | | | Surlyn 8150 | 30 | 30 | 24 | 30 |
| | | | | Surlyn 8945 | — | — | — | — |
| | | | | Surlyn 9150 | 20 | 20 | 16 | 30 |
| | | | | Surlyn 9120 | — | — | — | — |
| | | | | Himilan AM7329 | — | — | — | — |
| | | | | Slab hardness (Shore D) | 68 | 68 | 68 | 68 |
| | | | | Flexural modulus (MPa) | 450 | 450 | 450 | 450 |
| | | | | MFR(190° C. × 2.16 kg, g/10 min) | 5 | 5 | 5 | 5 |

TABLE 5-continued

| | | Golf ball No. | 9 | 10 | 11 | 12 |
|---|---|---|---|---|---|---|
| | | Center No. | A | C | C | C |
| | | (C) TPEE | — | — | — | 40 |
| | | Tungsten | — | 18 | 15 | 19 |
| Properties | | Density G2 (g/cm³) | 1.01 | 1.20 | 1.20 | 1.20 |
| | | Slab hardness H2 (Shore D) | 53 | 53 | 53 | 58 |
| | | Flexural modulus (MPa) | 179 | 248 | 226 | 330 |
| | | Max Loss Factor (tan δ, −20° C. to 0° C.) | 0.05 | 0.05 | 0.05 | 0.05 |
| | | Rebound resilience (%) | 60 | 60 | 62 | 56 |
| Intermediate Layer | | Mass W2 (g) | 4.14 | 4.92 | 4.92 | 4.92 |
| | | Volume V2 (cm³) | 4.1 | 4.1 | 4.1 | 4.1 |
| Cover | | Mass W3 (g) | 4.34 | 4.34 | 4.34 | 4.34 |
| | | Volume V3 (cm³) | 4.43 | 4.43 | 4.43 | 4.43 |
| Golf | | W2 + W3 (g) | 8.48 | 9.26 | 9.26 | 9.26 |
| Ball | | V2 + V3 (cm³) | 8.53 | 8.53 | 8.53 | 8.53 |
| | | Coefficient of Restitution (Index) | 100.1 | 100.1 | 100.1 | 100.2 |
| | | Durability | 115 | 105 | 105 | 80 |
| | | Moldability | G | G | G | G |

Formulation: Parts by mass
MFR: Melt Flow Rate

TABLE 6

| | | | | Golf ball No. | 13 | 14 | 15 | 16 |
|---|---|---|---|---|---|---|---|---|
| | | | | Center No. | C | C | B | C |
| Intermediate layer composition | Formulation | Resin Component | (A) | Modified Polyester Elastomer 1 | 20 | 80 | — | — |
| | | | | Modified Polyester Elastomer 2 | — | — | — | — |
| | | | | Slab hardness (Shore A) | 84 | 84 | — | — |
| | | | (B) | HPF1000 | — | — | — | 100 |
| | | | | Surlyn 8150 | 40 | 10 | 24 | — |
| | | | | Surlyn 8945 | — | — | — | — |
| | | | | Surlyn 9150 | 40 | 10 | 16 | — |
| | | | | Surlyn 9120 | — | — | — | — |
| | | | | Himilan AM7329 | — | — | — | — |
| | | | | Slab hardness (Shore D) | 68 | 68 | 68 | — |
| | | | | Flexural modulus (MPa) | 450 | 450 | 450 | — |
| | | | | MFR(190° C. × 2.16 kg, g/10 min) | 5 | 5 | 3.4 | — |
| | | | (C) | TPEE | — | — | 60 | — |
| | | | | Tungsten | 21 | 14 | 15 | 23 |
| | Properties | | | Density G2 (g/cm³) | 1.20 | 1.20 | 1.20 | 1.20 |
| | | | | Slab hardness H2 (Shore D) | 61 | 39 | 45 | 54 |
| | | | | Flexural modulus (MPa) | 380 | 180 | 120 | 185 |
| | | | | Max Loss Factor (tan δ, −20° C. to 0° C.) | 0.03 | 0.09 | 0.05 | 0.13 |
| | | | | Rebound resilience (%) | 54 | 64 | 63 | 64 |
| Intermediate Layer | | | | Mass W2 (g) | 4.92 | 4.92 | 4.92 | NG |
| | | | | Volume V2 (cm³) | 4.1 | 4.1 | 4.1 | |
| Cover | | | | Mass W3 (g) | 4.34 | 4.34 | 4.34 | |
| | | | | Volume V3 (cm³) | 4.43 | 4.43 | 4.43 | |
| Golf | | | | W2 + W3 (g) | 9.26 | 9.26 | 9.26 | |
| Ball | | | | V2 + V3 (cm³) | 8.53 | 8.53 | 8.53 | |
| | | | | Coefficient of Restitution (Index) | 100.5 | 99.8 | 100.0 | |
| | | | | Durability | 95 | 50 | 100 | |
| | | | | Moldability | G | G | G | P |

Formulation: Parts by mass
MFR: Melt Flow Rate
NG: Impossible to Mold

Notes on Tables 3 to 6
HPF100: a Magnesium ion neutralized ternary copolymer ionomer resin available from E.I. du Pont de Nemours and Company.
SURLYN 8150: a sodium ion neutralized ethylene-methacrylic acid copolymer ionomer resin (Acid content: 16 mass % or more, flexural modulus: 364 MPa, Melt Flow Rate (190° C., 2.16 kg): 4.5 Shore D hardness: 68) available from E.I. du Pont de Nemours and Company.
SURLYN 8945: a sodium ion neutralized ethylene-methacrylic acid copolymer ionomer resin (Acid content: less than 16 mass %, flexural modulus: 254 MPa, Melt Flow Rate (190° C., 2.16 kg): 5 Shore D hardness: 61) available from E.I. du Pont de Nemours and Company.
SURLYN 9120: a zinc ion neutralized ethylene-methacrylic acid copolymer ionomer resin (Acid content: 16 mass % or more, flexural modulus: 410 MPa, Melt Flow Rate (190° C., 2.16 kg): 1.3, Shore D hardness: 69) available from E.I. du Pont de Nemours and Company.
SURLYN 9150: a zinc ion neutralized ethylene-methacrylic acid copolymer ionomer resin (Acid content: 16 mass % or more, flexural modulus: 252 MPa, Melt Flow Rate (190° C., 2.16 kg): 4.5, Shore D hardness: 64) available from E.I. du Pont de Nemours and Company.
HIMILAN AM7329: a zinc ion neutralized ethylene-methacrylic acid copolymer ionomer resin (Acid content: less than 16 mass %, flexural modulus: 240 MPa, Melt Flow Rate (190° C., 2.16 kg): 5, Shore D hardness: 59) available from Du Pont-Mitsui Polychemicals Co., Ltd.

TPEE: Thermoplastic polyester elastomer (65 mass % of polytetramethylene glycol and 35 mass % of polybuthylene terephthalate)

Each of Golf balls No. 1 to 11 is golf balls having a center, a cover, and an intermediate layer disposed between the center and the cover, wherein the intermediate layer is formed from an intermediate layer composition having a flexural modulus ranging from 150 MPa to 450 MPa, a maximum loss factor (tan δ) between −20° C. and 0° C. of 0.08 or less, a rebound resilience of 55% or more, and a slab hardness ranging from 40 to 60 in Shore D hardness, and the intermediate layer composition comprises, as a resin component, 30 mass % to 70 mass % of (A) a modified polyester elastomer having a Shore A hardness of 95 or less; 70 mass % to 30 mass % of (B) a binary ionomer resin having a Shore D hardness of 65 or more, a flexural modulus of 300 MPa or more, and a melt flow rate (190° C., 2.16 kg) of 1.0 g/10 min or more; and 0 mass % to 50 mass % of (C) a thermoplastic resin other than (A) component and (B) component (provided that a total content of (A) component, (B) component, and (C) component is 100 mass %). The results indicated that each of them was excellent in moldability, distance, durability.

The present invention is directed to a golf ball and provides a golf ball excellent in the resilience, durability, and moldability. This application is based on Japanese Patent application No. 2010-087538 filed on Apr. 6, 2010, the contents of which are hereby incorporated by reference. Further, the golf ball of the present invention is excellent in resilience when hitting at the low head speed.

The invention claimed is:

1. A golf ball having a center, a cover, and an intermediate layer disposed between the center and the cover, wherein
the intermediate layer is formed from an intermediate layer composition having a flexural modulus ranging from 150 MPa to 450 MPa, a maximum loss factor (tan δ) between −20° C. and 0° C. of 0.08 or less, a rebound resilience of 55% or more, and a slab hardness ranging from 40 to 60 in Shore D hardness, and the intermediate layer composition comprises, as a resin component,
30 mass % to 70 mass % of (A) a modified polyester elastomer having a Shore A hardness of 95 or less;
70 mass % to 30 mass % of (B) a binary ionomer resin having a Shore D hardness of 65 or more, a flexural modulus of 300 MPa or more, and a melt flow rate (190° C., 2.16 kg) of 1.0 g/10 min or more;
0.1 mass % to 50 mass % of (C) a thermoplastic resin other than (A) component and (B) component (provided that a total content of (A) component, (B) component, and (C) component is 100 mass %);
wherein (A) the modified polyester elastomer is obtained by a reaction between (a-3) an unsaturated carboxylic acid or a derivative thereof and (a-2) a polyester elastomer containing a polyalkylene glycol component in a presence of (a-1) a radical generator,
wherein a blending ratio of (a-3) the unsaturated carboxylic acid or a derivative thereof ranges from 0.01 mass % to 30 mass % with respect to 100 mass % of (a-2) the polyester elastomer,
wherein a content of the polyalkylene glycol component in (a-2) the polyester elastomer is in a range from 5 mass % to 90 mass %, and
wherein (a-3) the unsaturated carboxylic acid or a derivative thereof comprises an unsaturated carboxylic anhydride or an unsaturated carboxylic acid ester,
wherein a content of an acid component in (B) the binary ionomer resin is 16 mass % or more, and
wherein (C) component is at least one member selected from the group consisting of polyurethane, polyolefin, polyester obtained by reacting polytetramethylene glycol with polybutylene terephthalate, polyamide, polystyrene, polycarbonate, polyacetal, modified poly(phenyleneether), polyimide, polysulfone, polyethersulfone, poly(phenylenesulfide), polyarylate, polyamideimide, polyetherimide, polyetheretherketone, polyetherketone, polytetrafluroroethylene, polyaminobismaleimide, polybisamidetriazole, an acrylonitrile-butadiene-styrene copolymer, an acrylonitrile-styrene copolymer, and an acrylonitrile-EPDM-styrene copolymer.

2. The golf ball according to claim 1, wherein the intermediate layer composition contains at least one filler selected from the group consisting of gold, tungsten, lead, copper, iron, cast iron, pig iron, zinc, titanium, aluminum, zirconium, aluminum oxide, bismuth oxide, cerium oxide, copper oxide, tin oxide, titanium oxide, yttrium oxide, zinc oxide, silica, barium sulfate, calcium carbonate, talc, montmorillonite, and mica in an amount ranging from 1 part to 40 parts by mass with respect to 100 parts by mass of the resin component.

3. The golf ball according to claim 1, wherein the intermediate layer has a thickness ranging from 0.5 mm to 1.2 mm, and the cover has a thickness ranging from 0.3 mm to 1.0 mm.

4. The golf ball according to claim 1, wherein the intermediate layer composition has a slab hardness ranging from 53 to 60 in Shore D hardness, and the intermediate layer has a density of 1.00 g/cm$^3$ or more.

5. The golf ball according to claim 1, wherein the cover has a Shore D hardness of 57 or more.

6. The golf ball according to claim 1, wherein the intermediate layer has mass W2 that is larger than mass W3 of the cover and a sum (W2+W3) of the mass of the intermediate layer and the cover is 8.4 g or more and less than 12.0 g.

7. The golf ball according to claim 1, wherein a sum (V2+V3) of a volume V2 of the intermediate layer and a volume V3 of the cover is 10.0 cm$^3$ or less.

8. The golf ball according to claim 1, wherein a blending ratio of (a-1) the radical generator ranges from 0.001 mass % to 3 mass % with respect to 100 mass % of (a-2) the polyester elastomer.

9. The golf ball according to claim 1, wherein the intermediate layer composition has a melt flow rate (230° C., 2.16 kg) ranging from 3 g/10 min to 30 g/10 min.

10. The golf ball according to claim 1, wherein the center has a central hardness H1c ranging from 25 to 55 in Shore D hardness.

11. The golf ball according to claim 1, wherein the center has a surface hardness H1s ranging from 35 to 65 in Shore D hardness.

12. The golf ball according to claim 1, wherein the center has a density G1 ranging from 1.00 g/cm$^3$ to 1.18 g/cm$^3$.

13. The golf ball according to claim 1, wherein the center has a compression deformation amount from 3.3 mm to 7.0 mm, when applying an initial load of 98 N to a final load of 1275 N to the center.

14. The golf ball according to claim 1, wherein the core has a compression deformation amount from 3.2 mm to 6.5 mm, when applying an initial load of 98 N to a final load of 1275 N to the core.

15. The golf ball according to claim 1, wherein the cover has a density G3 ranging from 0.97 g/cm$^3$ to 1.20 g/cm$^3$.

16. The golf ball according to claim 1 wherein the golf ball has a compression deformation amount from 2.5 mm to 3.8 mm, when applying an initial load of 98 N to a final load of 1275 N to the golf ball.

17. The golf ball according to claim 1, wherein a difference (G2−G1) between a density G2 of the intermediate layer and a density G1 of the center ranges from 0.01 g/cm$^3$ to 0.20 g/cm$^3$.

18. The golf ball according to claim 1, wherein (B) the binary ionomer resin has a melt flow rate (190° C., 2.16 kg) of 3.4 g/10 min or more.

19. The golf ball according to claim 1, wherein a degree of neutralization of carboxylic groups contained in (B) the binary ionomer resin is 20 mole % or more and 90 mole % or less.

* * * * *